Sept. 3, 1929.  F. L. MORSE  1,727,129
MULTIPLATE DRIVE CHAIN
Filed Jan. 26, 1926
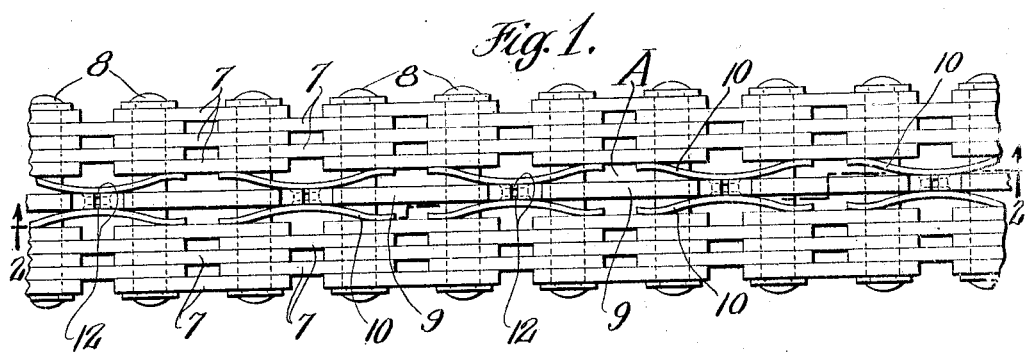
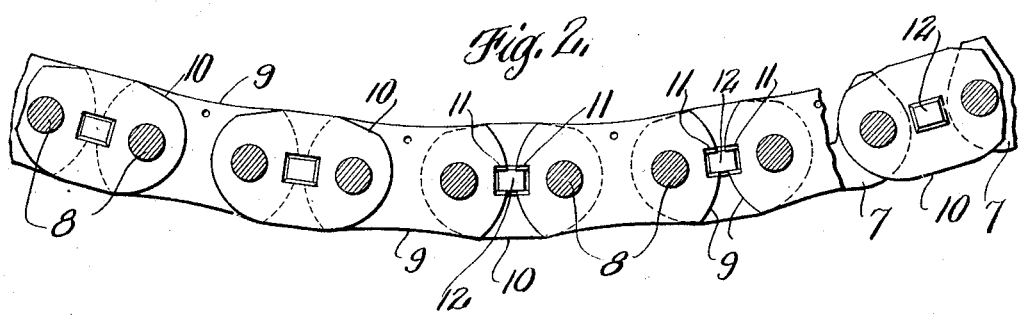
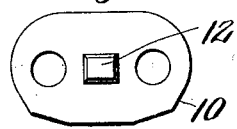 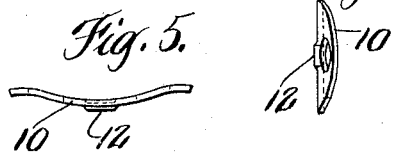
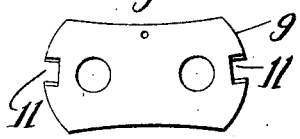 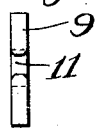
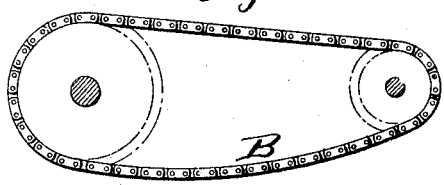
Inventor
Frank L. Morse
By his Attorneys
Symestvedt & Lechner Patented Sept. 3, 1929.

1,727,129

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

MULTIPLATE DRIVE CHAIN.

Application filed January 26, 1926. Serial No. 83,799.

This invention relates to drive chains and more particularly to those in which the links are formed of a plurality of plates.

The object of this invention is to provide a chain of novel, simple and inexpensive construction which will resist the forces tending to set up whipping thereof, and, consequently, reduce vibrations and wear and other objectionable consequences of whipping.

How the foregoing, together with such other objects and advantages as may hereinafter appear, or are incident to my invention, are realized, is illustrated in preferred form in the accompanying drawings, wherein—

Fig. 1 is a fragmentary plan view of a portion of a drive chain embodying my improvements;

Fig. 2 is a vertical section taken on the line 2—2 of Fig. 1;

Fig. 3 is a diagrammatic layout of a chain drive;

Figs. 4, 5 and 6 are detailed views of a link which I employ, and

Figs. 7 and 8 are detailed views of a link which I associate with the link of Figs. 4, 5 and 6 in carrying out my invention.

Referring to the drawings it will be seen that the links of the chain are composed of a plurality of plates 7 arranged in interspersed relation on the pintles 8. The links 7 are of the usual arch-shaped form which adapts them to extend over the teeth of a sprocket wheel.

In Fig. 1 I have shown these plates arranged in two groups spaced apart with plates of special construction arranged in the space between said groups and constituting a device, indicated by the reference letter A, for eliminating whipping of the chain as will further appear.

The device A comprises the central link plates 9 of rigid construction, and the spring link plates 10, arranged to constitute a strand of the chain composed of alternating rigid link plates and spring link plates. The ends of the link plates 9 are provided with slots 11 for receiving the projections 12 on the link plates 10, which projections are held into the slots by virtue of the spring action of the link plates 10. This is clearly shown in Fig. 1 from which it will be seen that the spring link plates 10 contact with certain links of the groups above referred to and with the central plates 9. Thus it will be seen that lateral pressure is exerted on the link plates, while, at the same time, the portions of the spring links having the projections 12 are pressed against the central link plates 9 so that the projections will snap into their respective slots 11 when the central plates assume positions relative to one another as will cause the slots and projections to register.

Referring more particularly to Fig. 7 I have preferably shown the slots 11 at the ends of the link plates 9 disposed at a slight angle whereby to cause that portion of the chain in which the snap means is effective to assume a curved position as shown in Figs. 2 and 3.

In Fig. 3 the slack run of the chain B is the portion in which the above positively acting means is effective. The links of the chain in the slack run B are held in fixed relation to one another by the engagement of the projections 12 with the slots 11 whereby the forces tending to cause whipping are resisted. It is pointed out that as the chain moves around the sprockets the links which become part of the slack run will snap into fixed relation with one another. As links leave the slack run the projections 12 will ride out of the slots due to the positive influence of the chain passing around the sprocket wheel. It will be noted that the engaging edges of the projections and notches are chamfered to cause a smooth action.

It is to be noted that the special link plates 9 and 10 are not shown of arch-shaped form and that they are adapted to extend into a groove in a sprocket wheel for guiding the chain on the wheel.

The central link plates 9 are provided with a small hole or other identification mark adjacent their upper edges to aid in assembling the chain to insure of positioning the plates right edge up.

I claim:—

1. A multiplate drive chain having pintles and links comprising a plurality of plates interspersed upon the pintles with the plates of adjacent links, and snap means for holding the links in a predetermined relation to one another legthwise of the chain, said snap means yielding under positive influences.

2. A multiplate drive chain having pintles and links comprising a plurality of plates interspersed upon the pintles with the plates of adjacent links, and a snap device operating to exert lateral pressure upon the link plates and also operating to hold adjacent links in a predetermined relation to one another lengthwise of the chain.

3. A chain comprising in combination a series of links composed of grouped overlapping plates spaced apart; and alternate notched plates and spring plates between said groups, said spring plates overlapping the notched plates and engaging plates of the aforesaid groups and having projections for engaging the notches in said notched plates.

4. A chain drive comprising in combination spaced sprocket wheels and an endless multiplate chain drivingly connecting said wheels including snap means for holding the links of the slack run of chain in fixed relation to one another to resist whipping influences.

5. In a drive chain, the combination of a pair of pintles, connecting link plates, a guide plate extending outwardly from each pintle, and a device operating on the adjacent ends of said guide plates for preventing whip of the chain.

6. In a drive chain, the combination of a pair of pintles, connecting links, and means for preventing whipping of the chain including a plate carried by each of said pintles and a spring plate engaging the adjacent ends of said plates.

7. In a drive chain, the combination of a pair of pintles, connecting links, and means for preventing whipping of the chain including a plate carried by each of said pintles and a spring plate engaging the adjacent ends of said plates, the plates carried by the pintles and the spring plates also serving as guide links.

In testimony whereof I have hereunto signed my name.

FRANK L. MORSE.